(No Model.)
R. D. BERRY.
SEEDING MACHINE.
No. 454,418. Patented June 16, 1891.
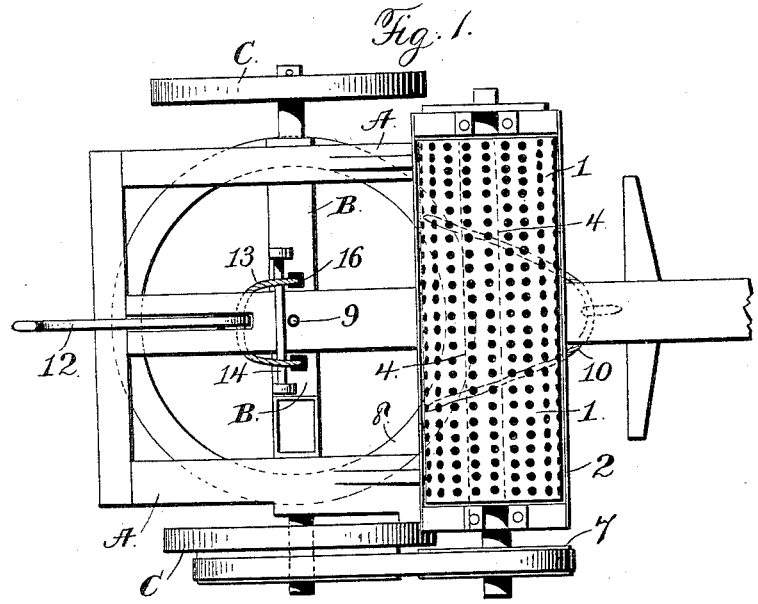
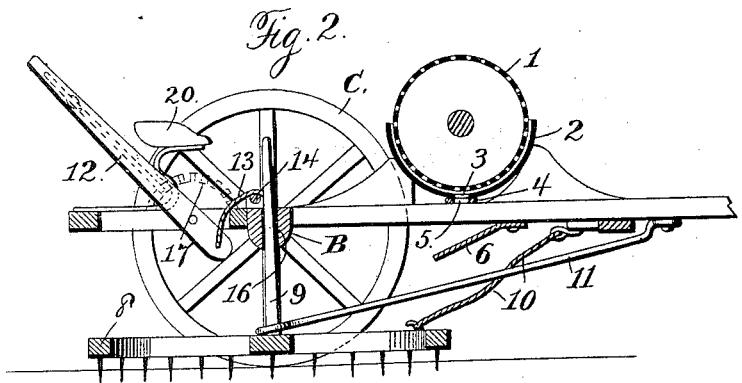
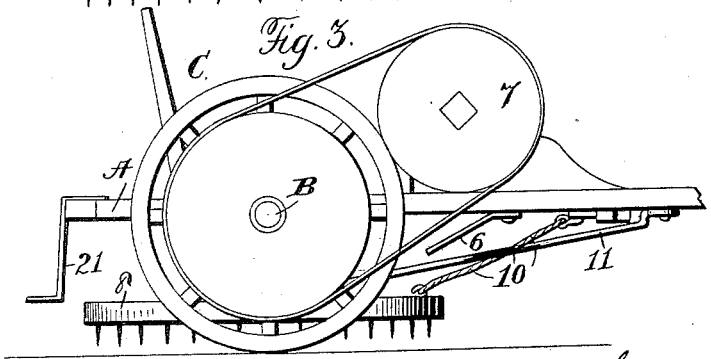
Witnesses:
Jas. E. Hutchinson.
G. F. Downing.
Inventor
R. D. Berry.
By H. A. Simmons atty.

UNITED STATES PATENT OFFICE.

RICHARD D. BERRY, OF AUBURN, ARKANSAS, ASSIGNOR OF ONE-HALF TO SIDNEY R. BERRY, OF SAME PLACE.

SEEDING-MACHINE.

SPECIFICATION forming part of Letters Patent No. 454,418, dated June 16, 1891.

Application filed December 24, 1890. Serial No. 375,920. (No model.)

*To all whom it may concern:*

Be it known that I, RICHARD D. BERRY, of Auburn, in the county of Sebastian and State of Arkansas, have invented certain new and useful Improvements in Seeding-Machines; and I do hereby declare the following to be a full, clear, and exact description of the invention, such as will enable others skilled in the art to which it appertains to make and use the same.

My invention relates to an improvement in seeding-machines, the object being to provide novel means for dropping, distributing, and covering seed and for regulating the quantity sown and the depth to which it is deposited; and it consists in certain novel features of construction and combinations of parts, as will be hereinafter described, and pointed out in the claims.

In the accompanying drawings, Figure 1 is a plan view. Fig. 2 is a sectional view, and Fig. 3 is a view in side elevation.

A represents the frame of the machine; B, the axle, and C C are the ground-wheels in which the axle is supported. On the forward end of the frame is revolubly supported the grain-cylinder 1. This cylinder is perforated throughout its surface to allow the grain to pass out. The cylinder may be made removable and may be replenished in any convenient manner. A sheathing 2 partly encircles the lower half of it, and this is provided at its lowest point with a series of openings 3 3, through which the grain is discharged. The size of these openings is regulated by a slide 4, which has holes 5 5, adapted to register with the openings 3 3 when open or to lie between them when closed. The size of these openings can be variously changed to regulate the amount of grain discharged. The grain drops from the revolving cylinder into the sheathing and gravitates to the openings which are at the lowest point in the sheathing and is discharged upon a deflector-plate 6 beneath, which is secured at its forward edge to the frame. This plate inclines slightly, so as to throw the grain backward and distribute it. The spindle of the cylinder has a sprocket or other wheel 7 on one end, and a chain or belt passes over this wheel and around a wheel on one of the ground-wheels, so that rotary motion is imparted to the cylinder from the wheel as the latter revolves.

The grain is covered by means of a scarifier 8. This is preferably circular in form, resembling a wheel with teeth on its lower face. It may be made to rotate or be simply arranged to vibrate, as preferred. This scarifier is provided with a shaft 9, which extends loosely through the frame, admitting of the raising and lowering of the scarifier and allowing it to turn completely around or to vibrate. In the construction shown provision is made for the vibration of the scarifier, and to this end short cables 10 extend loosely from the scarifier to the frame, allowing the former to turn slightly in either direction. A draft-rod 11 embraces the shaft 9 just below the axle, and is secured at its forward end to the frame for the purpose of taking some of the strain from the axle and upper end of the shaft 9.

When constructed as shown, provision is made for raising and lowering the scarifier. This consists in a hand-lever 12, fulcrumed near the rear of the frame. Short cables 13 13 extend from the lower end of this hand-lever to the scarifier, passing over roller or rollers 14 on the axle and through holes 16 16 in the axle. A toothed segment 17 or other means may be provided for locking this lever in different positions, and it may be swung back and forth to raise and lower the scarifier. Of course if the scarifier is made to rotate the cables 13 13 and cable 10 may be dispensed with. By means of the hand-lever the scarifier can be raised from the ground at any time, so that the machine can be moved easily from place to place. When in operation, the scarifier is lowered. A seat 20 may be located in some convenient place on the frame, and a step 21 may be located near the seat. For convenience, also, a tool-box is placed on the frame or axle.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a seeding-machine, the combination, with a frame, of a rotary perforated grain-cylinder, a sheathing partly surrounding this cylinder and provided with a series of openings, a slide for regulating the size of the openings, a deflector-plate located directly beneath these openings, and means for stirring the ground over which the grain is sown, substantially as set forth.

2. The combination, with a frame, a rotary perforated grain-cylinder, a sheathing partly surrounding the latter and provided with openings at the bottom, and a slide for regulating size of these openings, of a deflector-plate, a scarifier, and means for raising and lowering the latter and preventing its rotation, substantially as set forth.

In testimony whereof I have signed this specification in the presence of two subscribing witnesses.

RICHARD D. BERRY.

Witnesses:
B. F. BUN,
W. W. PUTNAM.